United States Patent
Cosquer et al.

(10) Patent No.: US 7,912,098 B2
(45) Date of Patent: Mar. 22, 2011

(54) SYSTEM, METHOD, AND DEVICE USING A SINGLY ENCAPSULATED BUNDLE AND A TAGGER FOR RE-ENCAPSULATION

(75) Inventors: Francois J. N. Cosquer, Kanata (CA); Tim Barrett, North Ryde (AU)

(73) Assignee: Alcatel Lucent, Paris (FR)

( * ) Notice: Subject to any disclaimer, the term of this patent is extended or adjusted under 35 U.S.C. 154(b) by 1027 days.

(21) Appl. No.: 11/727,973

(22) Filed: Mar. 29, 2007

(65) Prior Publication Data
US 2008/0240155 A1 Oct. 2, 2008

(51) Int. Cl.
| | |
|---|---|
| H04J 3/02 | (2006.01) |
| H04J 3/16 | (2006.01) |
| H04J 3/04 | (2006.01) |
| H04H 20/28 | (2008.01) |
| G06F 3/00 | (2006.01) |
| G06F 15/16 | (2006.01) |
| H04N 7/173 | (2006.01) |

(52) U.S. Cl. ........ 370/537; 370/466; 370/487; 370/535; 370/542; 719/319; 709/232; 725/105; 725/118; 725/119

(58) Field of Classification Search .......... 725/105, 725/114, 118, 119; 709/232; 370/466, 487, 370/535, 537, 542; 719/319
See application file for complete search history.

(56) References Cited

U.S. PATENT DOCUMENTS

| | | | |
|---|---|---|---|
| 7,047,305 B1 | 5/2006 | Brooks et al. | |
| 2002/0066013 A1* | 5/2002 | Relander et al. | 713/151 |
| 2003/0016630 A1* | 1/2003 | Vega-Garcia et al. | 370/252 |
| 2005/0198686 A1 | 9/2005 | Krause et al. | |
| 2007/0180488 A1* | 8/2007 | Walter et al. | 725/135 |
| 2008/0022321 A1* | 1/2008 | Ver Steeg et al. | 725/78 |
| 2008/0144660 A1* | 6/2008 | Godlewski | 370/468 |
| 2008/0209489 A1* | 8/2008 | Joyce et al. | 725/111 |

OTHER PUBLICATIONS

MacAulay et al., IP Streaming of MPEG-4: Native RTP vs MPEG-2 Transport Stream, Oct. 2005, Envivio, Inc.*
Multimedia Reasearch, IPTV Middleware Ranking Report: Rapid Scaling of Subscribers & Services, Jun. 2007, Quaterly Technology & Content Report.*
Cisco Headquarters, Cisco Wireline Video/IPTV Solution Design and Implementation Guide, Release 1.1, 2006.*
Rajiv Chaudhuri, End to End IPTV Design and Implementation, How to Avoid Pitfalls, 2008, Ericsson.*

* cited by examiner

*Primary Examiner* — Hoang-Vu A Nguyen-Ba
(74) *Attorney, Agent, or Firm* — Kramer & Amado, P.C.

(57) ABSTRACT

The invention provides for systems, methods, and a transport re-encapsulator/tagger for delivering streaming media to customer premises equipment. A digital streaming media system broadcasts streaming media to provider networks which use middleware which has certain requirements for the transport encapsulation and tagging of headers of the streaming media. The invention provides for re-encapsulating/tagging of media broadcasts having one type of transport encapsulation/tagging into a type of transport encapsulation/tagging required by the middleware.

17 Claims, 2 Drawing Sheets

SYSTEM, METHOD, AND DEVICE USING A SINGLY ENCAPSULATED BUNDLE AND A TAGGER FOR RE-ENCAPSULATION

FIELD OF THE INVENTION

The invention relates to electronic media delivery and more particularly to distribution of video and audio streams in IPTV systems from a media head end to IPTV providers for delivery to their subscribers.

BACKGROUND OF THE INVENTION

Delivery of IPTV (IP television) media in IPTV systems requires the co-operation of a large and often complicated array of hardware, software, and network infrastructure to deliver media streams from a content provider to the CPE (customer premises equipment) of a subscriber. The delivery of IPTV services from head end to CPE may traverse one and often more than one service provider and may involve equipment from various venders.

The term "IPTV service" is to be understood as the delivery of digital television and related services, such as video and audio programming, VoD (video on demand) and their associated electronic programming guides, over an IP (internet protocol) network. Although the protocol used to format the packets in the IPTV system is the same as that used for communicating over the public Internet, the "IP" in IPTV only indicates use of IP as a network protocol. Delivery of IPTV services almost always occurs over one or more private IP networks.

Many factors determine the end structure of an IPTV system but typical systems will include four major elements: a video head end; a service provider core/edge IP network; a service provider access network; and a home network. The video head end is where digital media including video, audio or both, is encapsulated for delivery through the IPTV system. The service provider core/edge IP network provides the necessary geographical and bandwidth requirements to deliver the media to a service location which has subscribers. Typically this network service is provided by a video service provider which has sufficient resources and coverage. In some cases specialized small to medium IPTV service providers, referred to as tier two or tier three IPTV service providers, also participate in this space. These tier two or tier three IPTV service providers do not have the bandwidth and coverage to justify or support a generic broadband core network like that of the video service provider, but they have enough of a core network to enable them to specialize in the delivery of IPTV services to their subscribers. The service provider access network, often referred to as "the last mile", is a broadband network connecting the premises of the customers to the broadband core network. This access network can be implemented over DSL, cable, or other broadband technology. This part of the IPTV system would typically be owned and operated by the tier two or tier three IPTV service provider. It should be noted however that some organizations possess a core broadband network and an access network, and provide IPTV services directly to subscribers. The home network includes equipment at the CPE such as a modem and/or set-top box which is the last stage in the delivery of digital media.

A primary part of an IPTV system is what is known as middleware. It resides between the head end and the media equipment at the CPE. This may include various functions on the redistribution and service boxes throughout the core and access networks, and the set-top box (STB) at the CPE. The STB is typically connected to media equipment such as a TV, HDTV, PVR, or audio system to play the video and/or audio content delivered over the IPTV system. In many cases enhanced interactive services such as electronic programming guides and video on demand (VoD) are provided to the subscriber at the CPE through the STB which communicates with middleware services boxes in the IPTV provider's network. Unlike older media delivery systems such as traditional over-the-air broadcasting, IPTV is a bidirectional system providing interactive services to subscribers. The interactive capabilities of the enhanced services such as the electronic programming guide and VoD are provided by the middleware solutions and are essential to a robust array of services expected by an IPTV subscriber. As such middleware is itself very important to the delivery of IPTV, and hence is very important to those organizations which participate in the delivery of IPTV.

Due to the large and complicated array of infrastructure required to deliver IPTV, it is often the case that more than one business entity must participate at the various stages of the delivery of IPTV to the subscriber. In some cases, one broadband service provider may be providing the network service necessary to support specialized IPTV service providers without being in the business of IPTV itself. These IPTV providers are responsible for providing the appropriate middleware to ensure the delivery of the specialized IPTV services to the subscriber. The middleware services boxes or redistribution middleware along with a compatible STB for use at the customer's premises will need to be implemented and supported by the IPTV provider. There are a number of various IPTV middleware vendors from which an IPTV provider can choose to implement the IPTV service to the home network. Some examples of middleware include Microsoft TV IPTV Edition, Alcatel-Lucent's MiView™ TV, and many others, and may also include solutions developed by organizations which are themselves involved in IPTV service delivery For various reasons, each particular type of middleware tends to have specific requirements for the transport encapsulation and tagging of the digital media it receives. Typically, each type of middleware requires certain fields or flags of the transport headers to be set in a certain manner.

FIG. 1 depicts an example known IPTV service delivery system. A content provider 10 provides the audio or video content to equipment of a video service provider network 20. In FIG. 1, the video service provider participates with four IPTV providers in the delivery of the IPTV services. Each IPTV provider provides, through its own network, services to a number of geographic locations which include customer premises equipment for each subscriber. In FIG. 1, a first IPTV provider's network 40 provides IPTV services to a first location (LOC1) 60 and a second location (LOC2) 61 each of which includes respective customer premises equipment 70 and 71. Each customer premises equipment would typically include a set top box (not shown) while the first IPTV provider's network 40 includes redistribution middleware 50 for interacting with the STBs to provide IPTV services throughout the first and second locations 60, 61. A second IPTV provider's network 42 provides IPTV services to a third location (LOC3) 62 which includes customer premises equipment 72. The second IPTV provider's network 42 includes redistribution middleware 52 for interacting with the STBs to provide IPTV services throughout the third location 62. A third IPTV provider's network 44 provides IPTV services to a fourth location (LOC4) 63 which includes customer premises equipment 73. The third IPTV provider's network 44 includes redistribution middleware 54 for interacting with the STBs to provide IPTV services throughout the fourth location 63. A fourth IPTV provider's network 46 provides IPTV services to a fifth location (LOC5) 64 and a sixth location (LOC6) 65 each of which includes respective customer premises equipment 74 and 75. The fourth IPTV provider's network 46 includes redistribution middleware 56 for interacting with the STBs to provide IPTV services throughout the fifth and sixth locations 64, 65.

Each IPTV provider's network 40, 42, 44, 46 has a respective transceiver 41, 43, 45, 47 for receiving video from the video service provider network 20. In a possible scenario, each IPTV provider may have a satellite downlink of video as well as some form of terrestrial backchannel 38a, 38b, 38c, to the video service provider. In FIG. 1, the first, second and third IPTV service provider's networks 40, 42, 44 receive video from the video service provider network 20 via satellite. The first IPTV provider's network 40 has a transceiver 41 which receives video from a first satellite 31 with a first broadband transceiver 27 of the video service provider network 20, while the transceivers 43, 45 of the second and third IPTV provider's networks 42, 44 receives video streams through a second satellite 34 with a second broadband transceiver 28 of the video service provider network 20. The fourth IPTV service provider's network 46 communicates terrestrially through its broadcast transceiver 47 with a terrestrial distribution transceiver 29 of the video service provider network 20.

Each IPTV provider's network has its own middleware solution which may or may not be the same as that of the other IPTV provider's networks. Additionally, since each middleware solution requires a specific transport encapsulation for the communications between the IPTV provider's network, and the video service provider network, the kind of encapsulation used in the delivery of IPTV services to each of the IPTV provider's network may or may not be the same.

In FIG. 1, the first IPTV provider's network utilizes middleware of a first type, the second and third IPTV provider's networks utilize middleware of a second type, while the fourth IPTV provider's network utilizes middleware of a third type. These three different types of middleware in general will require three different types of transport encapsulation. Since transport encapsulation of the IPTV media occurs at the head end, there must be three differently transport encapsulated media streams 21, 23, 25 delivered across the video service provider network to the IPTV provider's networks.

In FIG. 1, the three differently transport encapsulated media streams 21, 23, 25 originate from three different respective video head ends 22, 24, 26. A first type of transport encapsulation is used for media streams 21 emerging from a first head end 22. This media stream 21 traverses a connection 30 between the first broadband transceiver 27 and the first satellite and traverses a connection 32 between the first satellite 31 and the first IPTV provider's network's transceiver 41. A second type of transport encapsulation is used for media streams 23 emerging from a second head end 24. This media stream 23 traverses a connection 33 between the second broadband transceiver 28 and the second satellite 34 and traverses a connection 35 between the second satellite and the second IPTV provider's network's transceiver 43. The media stream 23 also traverses a connection 36 between the second satellite 34 and the third IPTV provider's network's transceiver 45. A third type of transport encapsulation is used for media streams 25 emerging from a third head end 26. This media stream 25 is transmitted from the terrestrial distribution transceiver 29 of the video service provider network 20 over a terrestrial connection 37 to the broadcast transceiver 47 of the fourth IPTV provider's network 46.

The first and second satellites 31, 34 could be owned and operated by the video service provider, or may be owned and operated by third parties, in which case, said third parties are used to outsource some of the communications of the video service provider network.

In cases where the video service provider operates a complete IPTV service from head end to CPE, the video service provider may own and operate a number of different IPTV networks servicing respective geographical location. For demographic, economic, and geographical reasons, the various IPTV networks of the IPTV system may utilize different middleware to customize service provided to the populations of each different location.

Having to supply a separate head end or at least a custom transport encapsulation for each type of middleware used in the various IPTV networks burdens the operations of the video service provider, creating logistic, economic problems as well as inflexibility in the provision of IPTV services to existing, upgrading, and future IPTV networks.

SUMMARY OF THE INVENTION

According to one aspect the invention provides for a system for streaming media delivery, the system comprising: a streaming media head end for generating streaming media; a video network for broadcasting said streaming media encapsulated according to a first type of transport encapsulation/tagging; first customer premises equipment for receiving said streaming media; a first digital media provider network comprising first digital media middleware compatible with a second type of transport encapsulation/tagging, said first digital media provider for transmitting said streaming media to said first customer premises equipment; and a first transport re-encapsulator/tagger for receiving said streaming media originating from said streaming media head end, for converting a transport encapsulation/tagging of said streaming media from said first type of transport encapsulation/tagging to said second type of transport encapsulation/tagging, and for transmitting said streaming media encapsulated/tagged according to said second type of transport encapsulation/tagging to said first digital media middleware.

In some embodiments of the invention, said streaming media head end is a video head end, said streaming media is IPTV media, said first digital media provider network is an IPTV provider network, and said first digital media middleware is IPTV middleware.

In some embodiments of the invention, said first type of transport encapsulation/tagging comprises at least one of a first type of MPEG-2 transport stream (TS) encapsulation/tagging, a first type of RTP encapsulation/tagging, and a first type of UDP encapsulation/tagging, and said second type of transport encapsulation/tagging comprises at least one of a second type of MPEG-2 TS encapsulation/tagging, a second type of RTP encapsulation/tagging, and a second type of UDP encapsulation/tagging.

In some embodiments of the invention, said first type of transport encapsulation/tagging comprises MPEG-2 TS over RTP, and said second type of transport encapsulation/tagging comprises MPEG-2 TS over UDP.

In some embodiments of the invention, said transport re-encapsulator/tagger converts said transport encapsulation/tagging of said streaming media from said first type of transport encapsulation/tagging to said second type of transport encapsulation/tagging by modifying at least one of a PES header of said streaming media, an MPEG-2 TS header of said streaming media, an RTP header of said streaming media, and a UDP header of said streaming media.

Some embodiments of the invention further provide for: second customer premises equipment for receiving said streaming media; a second digital media provider network having second digital media middleware compatible with a third type of transport encapsulation/tagging, said second digital media provider network for transmitting said streaming media to said second customer premises equipment; and a second transport re-encapsulator/tagger for receiving said streaming media originating from said streaming media head end, for converting a transport encapsulation/tagging of said streaming media from said first type of transport encapsulation/tagging to said third type of transport encapsulation/tagging, and for transmitting said streaming media encapsulated/tagged according to said third type of transport encapsulation/tagging to said second digital media middleware.

In some embodiments of the invention, said streaming media head end is a video head end, said streaming media is IPTV media, said first, second, and third digital media provider networks are IPTV provider networks, and said first, second, and third digital media middleware are respectively first, second, and third IPTV middleware.

In some embodiments of the invention, said first type of transport encapsulation/tagging comprises at least one of a first type of MPEG-2 transport stream (TS) encapsulation/tagging, a first type of RTP encapsulation/tagging, and a first type of UDP encapsulation/tagging, said second type of transport encapsulation/tagging comprises at least one of a second type of MPEG-2 TS encapsulation/tagging, a second type of RTP encapsulation/tagging, and a second type of UDP encapsulation/tagging, and said third type of transport encapsulation/tagging comprises at least one of a third type of MPEG-2 TS encapsulation/tagging, a third type of RTP encapsulation/tagging, and a third type of UDP encapsulation/tagging.

According to a second aspect, the invention provides for a method for streaming media delivery, the method comprising: generating streaming media at a streaming media head end; broadcasting said streaming media encapsulated according to a first type of transport encapsulation/tagging; receiving said streaming media generated at said streaming media head end at a first transport re-encapsulator/tagger; converting at said first transport re-encapsulator/tagger a transport encapsulation/tagging of said streaming media from said first type of transport encapsulation/tagging to a second type of transport encapsulation/tagging; transmitting said streaming media encapsulated/tagged according to said second type of transport encapsulation/tagging from said first transport re-encapsulator/tagger to first digital media middleware compatible with said second type of transport encapsulation/tagging; and transmitting said streaming media encapsulated/tagged according to said second type of transport encapsulation/tagging from said first digital media middleware to first customer premises equipment.

In some embodiments of the invention, said streaming media head end is a video head end, said streaming media is IPTV media, and said first digital media middleware is IPTV middleware.

In some embodiments of the invention, said step of converting said transport encapsulation/tagging of said streaming media from said first type of transport encapsulation/tagging to said second transport encapsulation comprises modifying at least one of a PES header of said streaming media, an MPEG-2 TS header of said streaming media, an RTP header of said streaming media, and a UDP header of said streaming media.

Some embodiments of the invention further provide for: receiving said streaming media generated at said streaming media head end at a second transport re-encapsulator/tagger; converting at said second transport re-encapsulator/tagger a transport encapsulation/tagging of said streaming media from said first transport encapsulation/tagging to a third transport encapsulation/tagging; transmitting said streaming media encapsulated/tagged according to said third transport encapsulation/tagging from said second transport re-encapsulator/tagger to second digital media middleware compatible with said third type of transport encapsulation/tagging; and transmitting said streaming media encapsulated/tagged according to said third transport encapsulation/tagging from said second digital media middleware to second customer premises equipment.

In some embodiments of the invention, said streaming media head end is a video head end, said streaming media is IPTV media, and said first, second, and third digital media middleware are respectively first, second, and third IPTV middleware.

According to a third aspect the invention provides for a transport re-encapsulator/tagger for use in an IPTV system, the transport re-encapsulator/tagger comprising: means for receiving streaming media having a first transport encapsulation/tagging; and means for converting a transport encapsulation/tagging of said streaming media from said first transport encapsulation/tagging to a second transport encapsulation/tagging for transmission to digital media middleware compatible with said second transport encapsulation/tagging.

According to a fourth aspect the invention provides for a method of providing digital media to customer premises equipment comprising: receiving a broadcast of streaming media having a first transport encapsulation/tagging; converting a transport encapsulation/tagging of said streaming media from said first transport encapsulation/tagging to a second transport encapsulation/tagging; transmitting said streaming media having said second transport encapsulation/tagging to digital media middleware compatible with said second transport encapsulation/tagging; and delivering said streaming media having said second transport encapsulation/tagging from digital media middleware to said customer premises.

BRIEF DESCRIPTION OF THE DRAWINGS

The features and advantages of the invention will become more apparent from the following detailed description of the preferred embodiments with reference to the attached figures, wherein.

It is noted that in the attached figures, like features bear similar labels.

DETAILED DESCRIPTION OF THE PREFERRED EMBODIMENTS

The provision of IPTV services through different middleware poses several problems in an IPTV system. In the video service provider network, costs associated with building multiple video head ends to support multiple types of middleware used by various IPTV service providers is inhibitive of cooperation between a single video service provider and multiple IPTV service providers. Cooperation between the video service provider network and the various IPTV provider's networks, is made extremely difficult with the requirement for separate broadcasts for each type of middleware increasing costs, and duplicating the use of resources to service each type of encapsulated IPTV service. In the case where bundles of channels are broadcast via satellite from a single video provider to various IPTV provider's networks, the video provider would be required to make multiple broadcasts to ensure each required type of encapsulation is present for the various IPTV provider's network's middleware. In the case where more than one video service provider provides IPTV relay service via satellite, due to the restraints of its middleware, IPTV service providers have to restrict their choices of IPTV services to those video service providers which have IPTV services encapsulated in a manner supported by their middleware.

A preferred embodiment of an IPTV system according to the invention, discussed below, provides an architecture for allowing a singly encapsulated bundle of channels be delivered to the various IPTV service providers, and then re-encapsulated into a form required by the particular middleware utilized in the IPTV service provider's network. This reduces redundancy and replication at the video head end, in the video service provider network, and in the satellite broadcast of the service. It is noted that in order to service multiple middleware platforms, there may also be requirements for transcoding the video payload (i.e. changing the video codec from one form to another). This is performed parallel to what is described in association with the embodiments of the invention.

Figure 2:
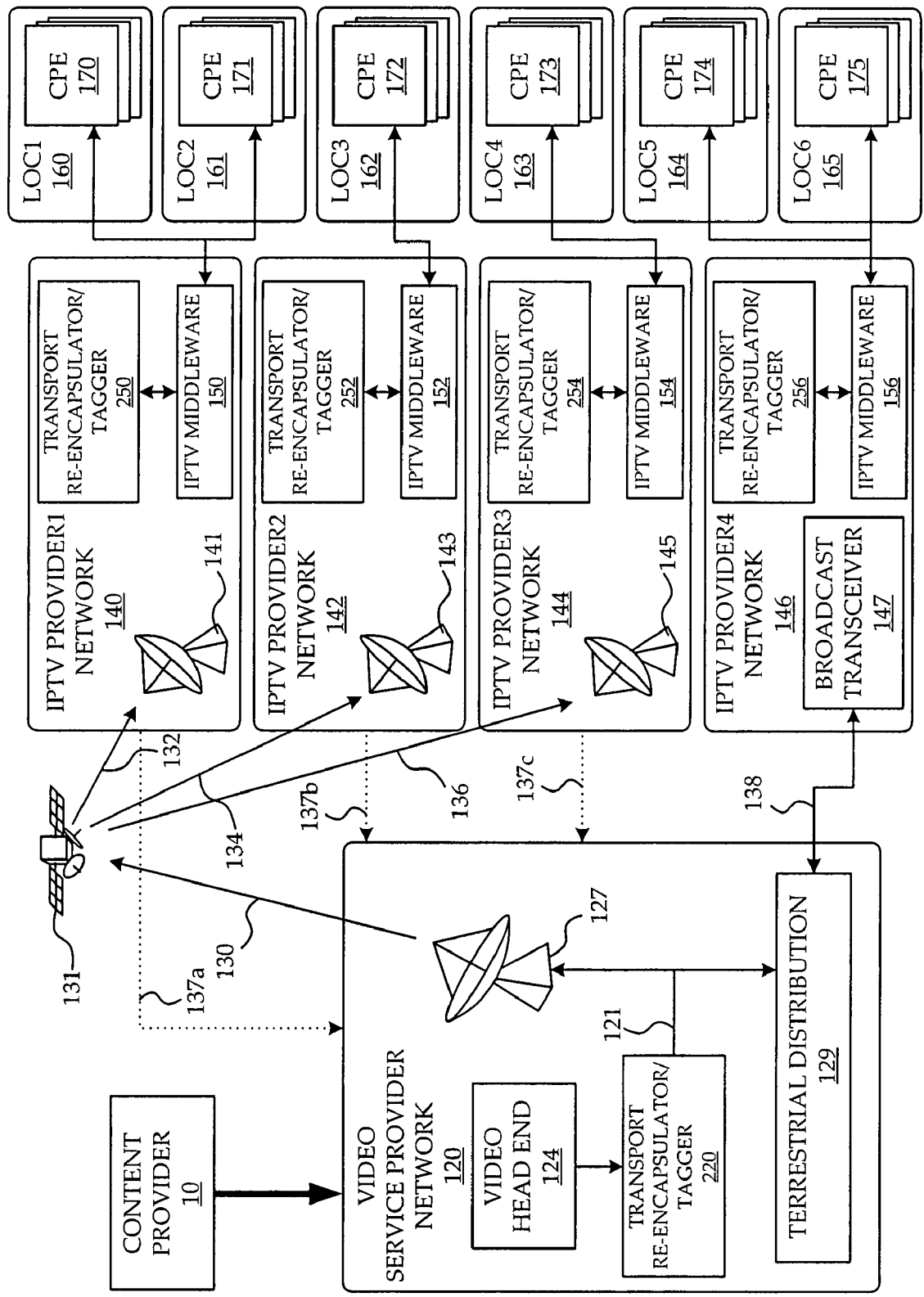
FIG. 2 is a block flow diagram illustrating an IPTV delivery system according to the preferred embodiment of the invention.

Referring to FIG. 2, the preferred embodiment of an IPTV system according to the invention will now be discussed.

As in the prior art, a content provider 10 provides the audio or video content to equipment of a video service provider network 120. In FIG. 2, the video service provider participates with four IPTV providers in the delivery of the IPTV services. In one embodiment, one or more of the IPTV providers may be the same business entity as the video service provider. Each IPTV provider provides, through its own network, services to a number of geographic locations which include customer premises equipment for each subscriber. In FIG. 2, a first IPTV provider's network 140 provides IPTV services to a first location (LOC1) 160 and a second location (LOC2) 161 each of which includes respective customer premises equipment 170 and 171. As in the prior art each customer premises equipment typically includes an STB (not shown) while the first IPTV provider's network 140 includes redistribution middleware 150 for interacting with the STBs to provide IPTV services throughout the first and second locations 160, 161. A second IPTV provider's network 142 provides IPTV services to a third location (LOC3) 162 which includes customer premises equipment 172. The second IPTV provider's network 142 includes redistribution middleware 152 for interacting with the STBs to provide IPTV services throughout the third location 162. A third IPTV provider's network 144 provides IPTV services to a fourth location (LOC4) 163 which includes customer premises equipment 173. The third IPTV provider's network 144 includes redistribution middleware 154 for interacting with the STBs to provide IPTV services throughout the fourth location 163. A fourth IPTV provider's network 146 provides IPTV services to a fifth location (LOC5) 164 and a sixth location (LOC6) 165 each of which includes respective customer premises equipment 174 and 175. The fourth IPTV provider's network 146 includes redistribution middleware 156 for interacting with the STBs to provide IPTV services throughout the fifth and sixth locations 164, 165.

Figure 1:
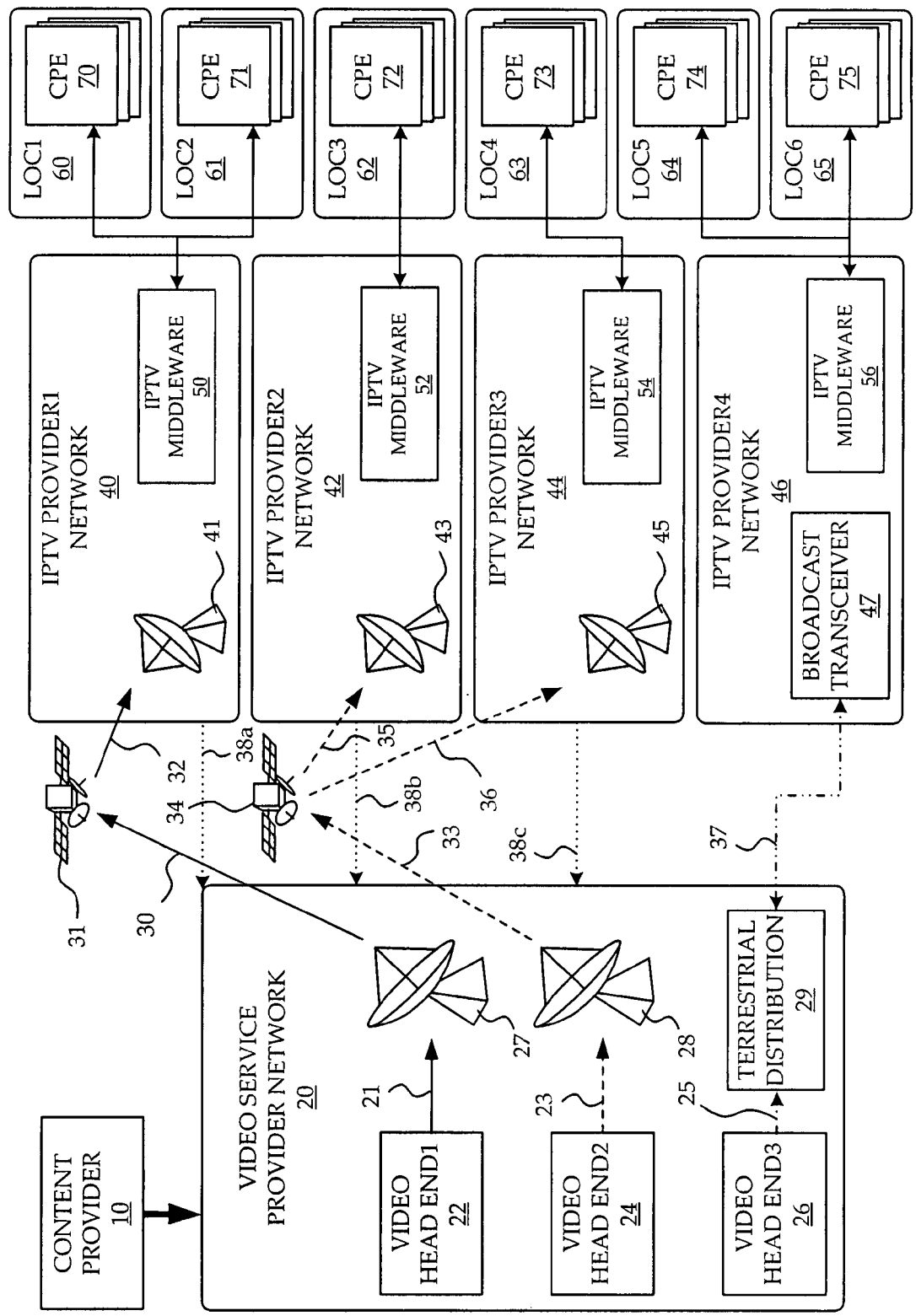
FIG. 1 is a block diagram illustrating an example of a known IPTV delivery system.

Each IPTV provider's network 140, 142, 144, 146 has a respective transceiver 141, 143, 145, 147 for receiving service from the video service provider network 120. In FIG. 1, the first, second and third IPTV service provider's networks 140, 142, 144 receive data from the video service provider network 120 via satellite. The first, second, and third IPTV provider's networks 140, 142, 144, have a respective transceiver 141, 143, 145 which receives data through a single satellite 131 from a broadband transceiver 127 of the video service provider network 120. Each of the IPTV provider's networks also communicates with the video service provider network 120 via respective terrestrial backchannels 137a, 137b, 137c. The fourth IPTV service provider's network 146 communicates terrestrially through its broadcast transceiver 147 with a terrestrial distribution transceiver 129 of the video service provider network 120.

Unlike in the prior art, the video service provider network 120 of the preferred embodiment has a single video head end 124. Transport encapsulation of the IPTV media occurs at the head end, and in the preferred embodiment there is a single transport encapsulated media stream originating at the head end 124 and hence the media streams 121 delivered through a broadcast transceiver 127 and terrestrial distribution transceiver 129 across the video service provider network 120 to the IPTV provider's networks has only one kind of encapsulation or tagging. This encapsulation or tagging of media streams delivered through the broadcast transceiver 127 and the terrestrial distribution transceiver 129 can be implemented optionally with a transport re-encapsulator/tagger 220 which re-encapsulates or tags the media stream emerging from the head end 124 into the desired type of encapsulation/tagging. The operation of such a transport re-encapsulator/tagger is described in more detail below in association with transport re-encapsulators/taggers 250, 252, 254, 256 of the four IPTV provider's networks 140, 142, 144, 146. In FIG. 2, identically transport encapsulated media streams 130, 138 originating from the video service provider network 120 are redistributed to each of the four IPTV provider's networks 140, 142, 144, 146. The media stream 130 transmitted from the broadcast transceiver 127 to the single satellite 131 is redistributed as identically transport encapsulated media streams 132, 134, 136 to the first, second, and third IPTV provider's network's 140, 142, 144, respective transceivers 141, 143, 145. The media stream 138 from the terrestrial distribution transceiver 129 is received by the broadcast transceiver 147 of the fourth IPTV service provider network 146.

At each of the transceivers of the IPTV service provider's networks, the IPTV services are transport encapsulated and/or tagged according to a single type of transport encapsulation. Each IPTV service provider's network 140, 142, 144 has a transport re-encapsulator/tagger 250, 252, 254, 256 which receives IPTV transport streams from the corresponding transceiver 141, 143, 145, 147 and outputs a middleware appropriate encapsulated and tagged stream to respective redistribution middleware 150, 152, 154, 156. For example, a first type of transport encapsulation and tagging is used to re-encapsulate and tag the media stream 132 arriving at the first IPTV provider's network 140 so that it is compatible with the redistribution middleware 150 in the first IPTV provider network 140. A second type of transport encapsulation and tagged is used to re-encapsulate and tag the media stream 134 arriving at the second IPTV provider's network 142 so that it is compatible with the redistribution middleware 152 in the second IPTV provider network 142. In the example embodiment of FIG. 2, the transport encapsulation and tagging required by the middleware of the third IPTV provider's network 144 is the same as the transport encapsulation and tagging required by the middleware of the second IPTV provider's network 142. As such the second type of transport encapsulation and tagging is used to re-encapsulate the media stream 136 arriving at the third IPTV provider's network 144 so that it is compatible with the redistribution middleware 154 in the third IPTV provider network 144. A third type of transport encapsulation is used to re-encapsulate and tag the media stream 138 arriving at the second IPTV provider's network 146 so that it is compatible with the redistribution middleware 156 in the second IPTV provider network 146.

Even though each IPTV provider's network has its own middleware solution which may or may not be the same as that of the other IPTV provider's networks, the preferred embodiment provides for delivery of multiple IPTV services from a single video head end and through a single satellite.

These three different types of middleware which require three different types of transport encapsulation/tagging are provided with the appropriate transport encapsulation/tagging by its corresponding transport re-encapsulator/tagger.

Since the IPTV service between the head end and the middleware in the IPTV provider's networks is only of a single type of transport encapsulation/tagging, redundancy and duplication of resources and equipment is reduced.

In the video service provider network, instead of three video head ends only one is utilized, and instead of two broadcast transceivers in the video service provider network only one is used, additionally instead of two satellites, only one is used.

Each IPTV provider's network, due to the flexibility afforded by the transport re-encapsulator/tagger, is no longer restricted to receiving IPTV services from video service providers or satellites which have a particular transport encapsulation/tagging.

Satellite service providers also can service a larger number of different IPTV provider's networks having different middleware.

In cases where the video service provider operates a complete IPTV service from head end to CPE, the video service provider may own and operate a number of different IPTV networks servicing respective geographical location. For demographic, economic, commercial, geographical reasons, and possibly due to an IPTV provider migrating from one middleware platform to another, the various IPTV networks of the IPTV system may utilize different middleware. An IPTV service such as this could easily be implemented by delivery of IPTV having a single transport encapsulation to various transport re-encapsulator/taggers which re-encapsulate/tag the IPTV service into a type of encapsulation/tagging appropriate to the middleware of the particular IPTV provider network.

The transport re-encapsulator/taggers of the preferred embodiment of an IPTV system de-encapsulate and re-encapsulate/tag IPTV streams. This entails manipulation of data in transport stream headers in order to provide compatibility or enhancements for specific IPTV middleware. Re-encapsulation/tagging does not affect the video payload in any way but may include the tagging of transport headers based on the information in that payload. It must be emphasized that transport re-encapsulation/tagging does not cause or perform any traditional transcoding process which re-encodes or decodes video and audio payload.

Each transport re-encapsulator/tagger has a server or appliance based application that allows definition of an expected type of transport encapsulation and tagging of an input stream, and conversion parameters which define the transport encapsulation and tagging of an output stream. In its place within the IPTV system illustrated in FIG. 2, the re-encapsulator/tagger converts between a transport encapsulation/tagging used in the video head end 124 (or optionally a transport encapsulation/tagging used in the transport re-encapsulator/tagger 220 of the video service provider network 120) and the transport encapsulation/tagging required by the corresponding redistribution middleware 150, 152, 154, 156.

One common transport encapsulation for video streams is the MPEG-2 transport stream (TS) encapsulation defined in the first part of the MPEG-2 system (ISO/IEC Standard 13818-1). This may be further encapsulated in UDP (Unreliable Datagram Protocol), or further be encapsulated with RTP (Real-time Transport Protocol) using RFC 2250/3550 or other standards which is encapsulated in IP. The transport re-encapsulator/tagger can, if required, re-encapsulate/tag the MPEG-2 transport stream by modifying, re-creating, or adding TS header fields, UDP header fields, PES (packetized elementary stream) header fields, or RTP header fields as required by the particular corresponding middleware being utilized. It is also possible in general to encapsulate/tag the streaming media completely or partially with a proprietary type of encapsulation/tagging. It may become common practice to use RTP streams for distribution to the IPTV service providers, in which case a common RTP stream could be sent to each of the IPTV service provider's and then the re-encapsulator/tagger could be used to remove the RTP encapsulation and provide an MPEG-2 TS stream with appropriate tagging to the IPTV service provider middleware systems. An advantage with this approach is that RTP encapsulation provides packet numbering and timing information that allows the quality of service delivery to be easily monitored, though many middleware systems today do not support RTP and require MPEG-2 TS on UDP as a source input.

Another specific type of re-encapsulation/tagging could involve the adding or clearing of the random access indicator in the adaptation field of the TS packet header based on the existence of a reference frame in the video stream. The random access indicator is a 1-bit field that indicates that the current Transport Stream packet, and possibly subsequent Transport Stream packets with the same PID, contain some information to aid random access at this point. Depending upon how middleware utilizes this field it may need to be modified or reset. This indicator may be required, for example, to indicate the presence of a start of a GOP (Group of Pictures) or reference frame that may be used for instant channel change which only some types of middleware support.

Another specific type of re-encapsulation/tagging could involve rebuilding of the PAT or PMT (Program Association Tables or Program Map tables) to suit specific middleware requirements.

In the preferred embodiment the re-encapsulator/tagger provides a set of simple rules by which an operator may configure and define the conversion process between an expected type of encapsulation from the video head end and the type of encapsulation of the middleware. This may be provided through simple web based configuration, XML template files, or similar technologies that allow simple alteration and definition of configuration information for both input and output streams of the re-encapsulator/tagger, providing flexibility and ease of use in defining input and output formats. In some embodiments the re-encapsulator/tagger may include a set of the more commonly required transport encapsulation/tagging for typical middleware, in the form of predefined configurations.

In the example embodiment of FIG. 2, the satellite provider fits within a scheme in which its satellite 131 supports the different IPTV middleware platforms of the IPTV service provider's networks 140, 142, 144, 146 by broadcasting the video stream as a standard MPEG-2 transport stream encapsulated in RTP as defined RFC2250. Some of the IPTV middleware supports this format while some of it requires simply the MPEG-2 transport stream over UDP. For the IPTV middleware that requires MPEG-2 TS over UDP, the re-encapsulator/taggers remove the RTP encapsulation, add UDP encapsulation as required, and make any other subtle changes in the required tags in the MPEG-2 Transport stream headers.

As can be seen one of the many benefits derived from the above described IPTV system is allowing video service providers and satellite providers to easily provide a single bundle of channels having a single type of transport encapsulation to a large number of IPTV providers having any number of different types of middleware and hence enable servicing of a broad market of smaller, tier two and tier three carriers.

Although most of the transport re-encapsulator/taggers of the preferred embodiment have been shown to be used at the IPTV provider's networks, it should be understood that they may be deployed elsewhere throughout the IPTV system to help ensure support of broadcast to many different middleware platforms. For example, one context in which an optional transport re-encapsulator/tagger 220 is used would be when a video service providers provide IPTV services to a number of tier two or tier three IPTV providers who have middleware which have some similar requirements but some differences. In addition to each IPTV provider having a transport re-encapsulator/tagger, the broadband provider could implement the transport re-encapsulator/tagger 220 downstream from the video head end in the video service provider network to create a IPTV broadcast which meets the common requirements of the IPTV providers. Configuration of the various transport re-encapsulator/taggers at the IPTV provider's networks would be less complex, and the amount of re-encapsulation required would also be minimized.

It should be understood that although IPTV middleware at various locations may differ for various unchanging operational reasons, the middleware may vary from location to location for various temporary reasons. One such a reason is an upgrade or switchover of middleware at the IPTV provider's network. With the transport re-encapsulator/taggers in place, the new and old middleware can function simultaneously without the need for an additional video head end broadcast with the new type of transport encapsulation. Migration to new middleware may be assisted by a re-encapsulator/tagger located at the IPTV provider's network with the new middleware, to re-encapsulate an old version of the transport encapsulation. Alternatively, a re-encapsulator/tagger could be used in the video service provider network to create a transport encapsulation as required by the new middleware, while the IPTV provider's network with the old middleware could utilize a transport re-encapsulator/tagger which re-encapsulates the new transport encapsulation to match the old transport encapsulation. This would be ideal in a case where new encapsulation requires processing of the payload, and in a case where converting to the old encapsulation is relatively simple, such as by removing headers, and or fields.

Although the preferred embodiment has been discussed with respect to IPTV, it should be understood that the transport re-encapsulator/tagger, the method of using it, and the system utilizing it could be any digital media service, in which case the IPTV provider's networks are digital media provider networks, and the IPTV middleware is digital media middleware, and similarly for the entire digital media delivery system.

The embodiments presented are exemplary only and persons skilled in the art would appreciate that variations to the embodiments described above may be made without departing from the spirit of the invention. The scope of the invention is solely defined by the appended claims.

We claim:

1. A system for streaming media delivery, the system comprising:
   a streaming media head end for generating streaming media;
   a video network for broadcasting the generated streaming media in a singly encapsulated bundle according to a first type of transport encapsulation;
   a first customer premises equipment for receiving the broadcasted streaming media;
   a first digital media provider network comprising first digital media middleware compatible with a second type of transport encapsulation, wherein the second type of transport encapsulation is different from the first type of transport encapsulation, said first digital media provider network for transmitting the broadcasted streaming media to said first customer premises equipment; and
   a first transport tagger for receiving the broadcasted streaming media originating from said streaming media head end, for converting the broadcasted streaming media from said first type of transport encapsulation to said second type of transport encapsulation, and for transmitting the converted streaming media encapsulated according to said second type of transport encapsulation to said first digital media middleware.

2. The system of claim 1, wherein said streaming media head end is a video head end, wherein the broadcasted streaming media are Internet Protocol Television (IPTV) media, wherein said first digital media provider network is an IPTV provider network, and wherein said first digital media middleware is IPTV middleware.

3. The system of claim 2, wherein said first type of transport encapsulation comprises at least one of a first type of Moving Pictures Expert Group 2 (MPEG-2) transport stream (TS) encapsulation, a first type of Real-Time Transport Protocol (RTP) encapsulation, and a first type of User Datagram Protocol (UDP) encapsulation, and wherein said second type of transport encapsulation comprises at least one of a second type of MPEG-2 TS encapsulation, a second type of RTP encapsulation, and a second type of UDP encapsulation.

4. The system of claim 2, wherein said first type of transport encapsulation comprises MPEG-2 TS over RTP, and wherein said second type of transport encapsulation comprises MPEG-2 TS over UDP.

5. The system of claim 2, wherein said first transport tagger converts said transport encapsulation of the broadcasted streaming media from said first type of transport encapsulation to said second type of transport encapsulation by modifying at least one of a Packetized Elementary Stream (PES) header of said streaming media, an MPEG-2 TS header of the broadcasted streaming media, an RTP header of the broadcasted streaming media, and a UDP header of the broadcasted streaming media.

6. The system of claim 1, further comprising:
   a second customer premises equipment for receiving the broadcasted streaming media;
   a second digital media provider network having second digital media middleware compatible with a third type of transport encapsulation, wherein the third type of transport encapsulation is different from both the first type of transport encapsulation and the second type of transport encapsulation, said second digital media provider network for transmitting the broadcasted streaming media to said second customer premises equipment; and a second transport tagger for receiving the broadcasted streaming media originating from said streaming media head end, for converting a transport encapsulation of the received streaming media from said first type of transport encapsulation to said third type of transport encapsulation, and for transmitting the converted streaming media encapsulated according to said third type of transport encapsulation to said second digital media middleware.

7. The system of claim 6, wherein said streaming media head end is a video head end, wherein the broadcasted streaming media are IPTV media, wherein said first, second, and third digital media provider networks are IPTV provider networks, and wherein said first, second, and third digital media middleware are respectively first, second, and third IPTV middleware.

8. The system of claim 7, wherein said first type of transport encapsulation comprises at least one of a first type of MPEG-2 transport stream (TS) encapsulation, a first type of RTP encapsulation, and a first type of UDP encapsulation, wherein said second type of transport encapsulation comprises at least one of a second type of MPEG-2 TS encapsulation, a second type of RTP encapsulation, and a second type of UDP encapsulation, and wherein said third type of transport encapsulation comprises at least one of a third type of MPEG-2 TS encapsulation, a third type of RTP encapsulation, and a third type of UDP encapsulation.

9. A method for streaming media delivery, the method comprising:
generating streaming media at a streaming media head end;
broadcasting the generated streaming media in a singly encapsulated bundle according to a first type of transport encapsulation;
receiving the broadcasted streaming media generated at said streaming media head end at a first transport tagger;
converting, at said first transport tagger, a transport encapsulation of the broadcasted streaming media from said first type of transport encapsulation to a second type of transport encapsulation, wherein the second type of transport encapsulation is different from the first type of transport encapsulation;
transmitting the converted streaming media encapsulated according to said second type of transport encapsulation from said first transport tagger to first digital media middleware compatible with said second type of transport encapsulation; and
delivering the transmitted streaming media encapsulated according to said second type of transport encapsulation from said first digital media middleware to a first customer premises equipment.

10. The method of claim 9, wherein said streaming media head end is a video head end, wherein the broadcasted streaming media are IPTV media, and wherein said first digital media middleware is IPTV middleware.

11. The method of claim 10, wherein said first transport encapsulation comprises at least one of a first type of MPEG-2 transport stream (TS) encapsulation, a first type of RTP encapsulation, and a first type of UDP encapsulation, and wherein said second type of transport encapsulation comprises at least one of a second type of MPEG-2 TS encapsulation, a second type of RTP encapsulation, and a second type of UDP encapsulation.

12. The method of claim 10, wherein said first type of transport encapsulation comprises MPEG-2 TS over RTP, and wherein said second type of transport encapsulation comprises MPEG-2 TS over UDP.

13. The method of claim 10, wherein said step of converting further comprises:
modifying at least one of a PES header of the broadcasted streaming media, an MPEG-2 TS header of the broadcasted streaming media, an RTP header of the broadcasted streaming media, and a UDP header of the broadcasted streaming media.

14. The method of claim 9, further comprising:
receiving the broadcasted streaming media generated at said streaming media head end at a second transport tagger;
converting, at said second transport tagger, a transport encapsulation of the broadcasted streaming media from said first transport encapsulation to a third transport encapsulation;
transmitting the converted streaming media encapsulated according to said third transport encapsulation from said second transport tagger to second digital media middleware compatible with said third type of transport encapsulation, wherein the third type of transport encapsulation is different from both the first type of transport encapsulation and the second type of transport encapsulation; and
delivering the transmitted streaming media encapsulated according to said third transport encapsulation from said second digital media middleware to a second customer premises equipment.

15. The method of claim 14, wherein said streaming media head end is a video head end, wherein the broadcasted streaming media are IPTV media, and wherein said first, second, and third digital media middleware are respectively first, second, and third IPTV middleware.

16. The method of claim 15, wherein said first type of transport encapsulation comprises at least one of a first type of MPEG-2 transport stream (TS) encapsulation, a first type of RTP encapsulation, and a first type of UDP encapsulation, wherein said second type of transport encapsulation comprises at least one of a second type of MPEG-2 TS encapsulation, a second type of WIT encapsulation, and a second type of UDP encapsulation, and said third type of transport encapsulation comprises at least one of a third type of MPEG-2 TS encapsulation, a third type of RTP encapsulation, and a third type of UDP encapsulation.

17. A method of providing digital media to customer premises equipment comprising:
broadcasting streaming media in a singly encapsulated bundle with a first transport encapsulation;
receiving the broadcasted streaming media having the first transport encapsulation;
converting a transport encapsulation of the broadcasted streaming media from said first transport encapsulation to a second transport encapsulation, wherein the second type of transport encapsulation is different from the first type of transport encapsulation;
transmitting the converted streaming media having said second transport encapsulation to digital media middleware compatible with said second transport encapsulation; and
delivering the transmitted streaming media having said second transport encapsulation from the digital media middleware to said customer premises equipment.

* * * * *